No. 661,230. Patented Nov. 6, 1900.
M. ROBACKER.
GRASS CATCHER FOR LAWN MOWERS.
(Application filed Aug. 2, 1900.)

(No Model.) 2 Sheets—Sheet 1.

WITNESSES:
Geo. W. Eisenbraun
E. P. Hendrickson.

INVENTOR:
Michael Robacker
BY Faberduteur
ATTORNEY.

No. 661,230. Patented Nov. 6, 1900.
M. ROBACKER.
GRASS CATCHER FOR LAWN MOWERS.
(Application filed Aug. 2, 1900.)
(No Model.) 2 Sheets—Sheet 2.

WITNESSES:
Grow Eisenbraun
E. P. Hendrickson

INVENTOR:
Michael Robacker,
BY
ATTORNEY

UNITED STATES PATENT OFFICE.

MICHAEL ROBACKER, OF GREENWICH, CONNECTICUT.

GRASS-CATCHER FOR LAWN-MOWERS.

SPECIFICATION forming part of Letters Patent No. 661,230, dated November 6, 1900.

Application filed August 2, 1900. Serial No. 25,690. (No model.)

*To all whom it may concern:*

Be it known that I, MICHAEL ROBACKER, a citizen of France, residing at Greenwich, in the county of Fairfield and State of Connecticut, have invented certain new and useful Improvements in Grass-Catchers for Lawn-Mowers, of which the following is a specification.

My invention has reference to improvements in grass-catching attachments for lawn-mowers of that class comprising a receptacle adapted to receive the grass as it is cut from the lawn and to deposit the same in a pile at any desired spot.

My invention has for its object to provide a simple and light receptacle which can be readily attached to a lawn-mower and is constructed to insure the delivery of all the grass collected in a compact heap when operated by a simple mechanism placed within convenient reach of the operator.

With this object in view my invention consists, essentially, in a grass-catcher for lawn-mowers and the like, comprising a receptacle adapted to receive the cut grass and formed in two sections arranged in line, one of which sections is provided with a hinged bottom, while the other section is hinged to turn about the first section, and an operating mechanism for turning the hinged bottom and the hinged section toward each other to dump the contents of the receptacle.

The nature of my invention will best be understood when described in connection with the accompanying drawings, in which—

Figure 1:
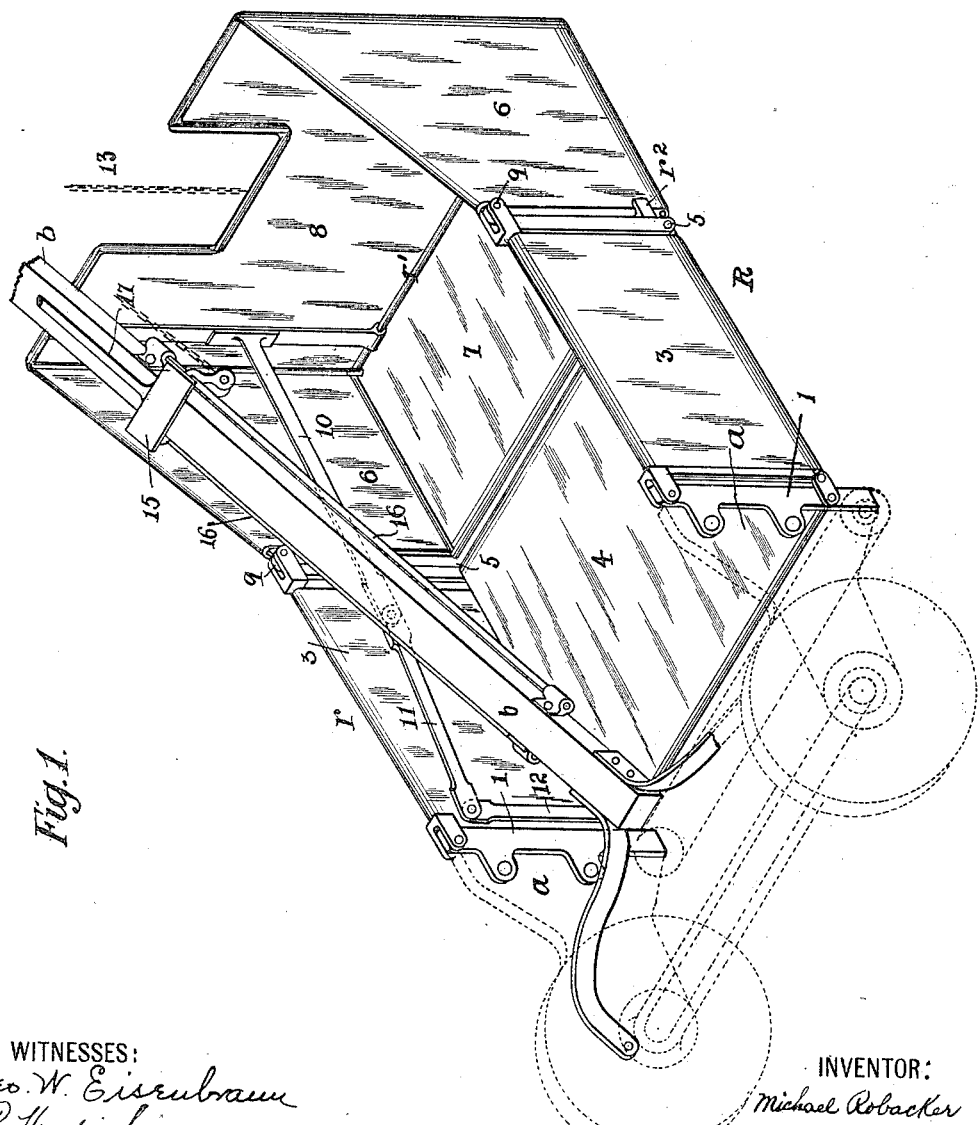
Figure 2:
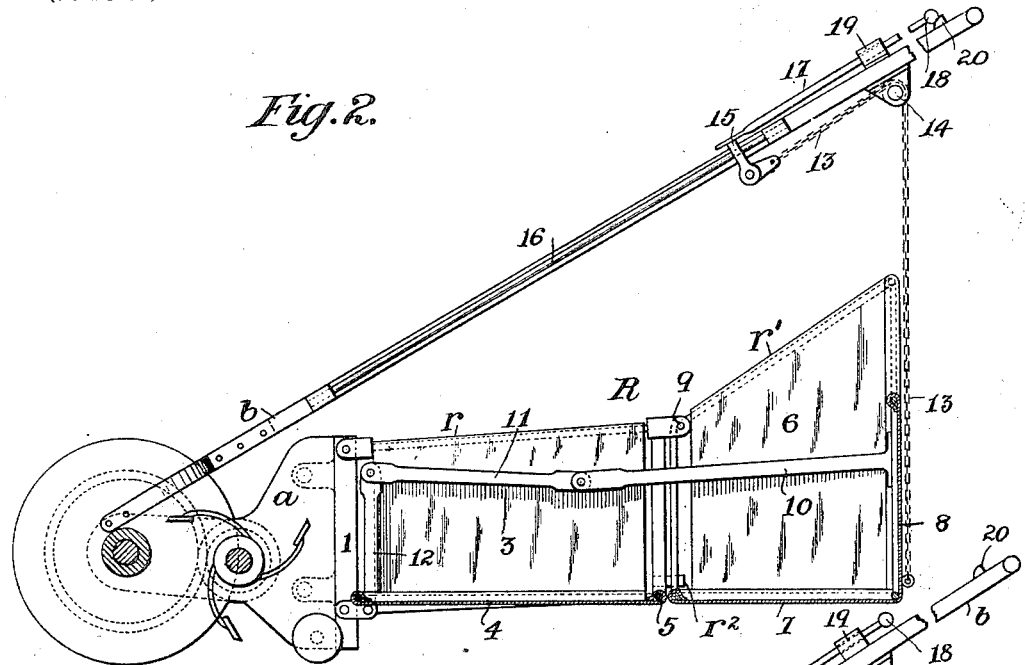
Figure 3:
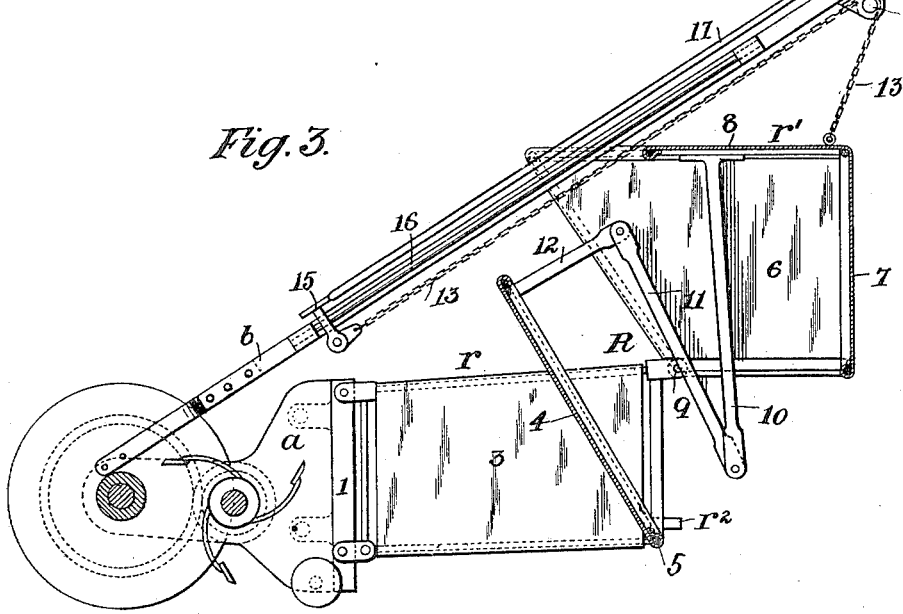

Figure 1 represents a perspective view of a lawn-mower provided with my improved grass-catcher. Fig. 2 is a vertical longitudinal section of the same, showing the parts of the grass-catcher in their receiving position, part being broken away. Fig. 3 is a similar view showing the parts of the grass-catcher in their discharging positions.

Similar letters and numerals of reference designate corresponding parts throughout the several views of the drawings.

Referring to the drawings, the letters $a$ $a$ designate the side frames of a lawn-mower of a usual construction, and $b$ is the handle attached to said side frames, as usual. The receptacle R for receiving and dumping the grass is attached to said side frames $a$ or to any other suitable part of the mower and preferably in such a manner as to be readily applied to and removed from the same. In the present instance I have shown a bracket 1 secured to each of the side frames $a$, to which brackets the front ends of the receptacle R are removably attached at their tops and bottoms by pins passing through said ends and the brackets.

The receptacle R is composed of two sections $r$ and $r'$, which when in the positions shown in Figs. 1 and 2 form a rectangular box or hopper open at its front and top for the reception of the grass thrown backwardly by the cutter of the mower. The several parts of the receptacle are preferably constructed of strong wire bent into the proper shape and covered with duck, canvas, or suitable wire-netting; but of course it is to be understood that they may be formed in any other suitable manner and of other material, as the main object of this construction is to obtain an attachment having comparatively little weight.

The section $r$ of the receptacle consists of two side walls 3, which are attached at their front ends to the brackets 1 in the manner previously described, and of a bottom 4, which is hinged at 5 to the rear portion of the section $r$, so that it can be swung upwardly and rearwardly toward the section $r'$ to assume the position shown in Fig. 3. The bottom 4 lies between the side walls 3 and extends throughout the length of the section $r$. The section $r'$ is composed of side walls 6, a stationary bottom 7, and a rear wall 8, said side walls being tapered upwardly to the higher rear wall 8 for the purpose of insuring the collection of all the cut grass. The said section $r'$ is hinged to the upper rear portions of the side walls 3 of the section $r$, so that it can be swung forwardly and upwardly toward the said section $r$ until it assumes the position shown in Fig. 3. The hinging of the section $r'$ to the section $r$ may be effected by the use of suitable pintles or rivets 9 and the section $r'$ held to the section $r$ by lugs $r^2$, projecting from the side walls 3 of the latter. For imparting the previously-described movements to the bottom 4 of the section $r$ and to the section $r'$ of the receptacle I employ the following mechanism:

To the rear wall 8 of the section $r'$ and in close proximity to the side walls thereof are rigidly attached two bars 10, which project inwardly and are connected by links 11 with bars 12, projecting upwardly from the free end of the bottom 4 of the section $r$. To the rear wall 8 of the section $r'$ is attached one end of a chain or cord 13, which is conducted over a pulley 14, mounted on the handle $b$ of the mower and attached to a cross-head 15, adapted to slide upon suitable guide-bars 16, extending in the longitudinal direction of the handle and secured thereto at their opposite ends. The cross-head 15 is moved on its guide-bars by means of a rod 17, connected to said cross-head and provided at its upper end with a suitable handle 18, placed within convenient reach of the operator. The rod 17 may be guided in a suitable bearing 19, secured to the handle $b$, and a suitable stop 20 may be placed on the handle to limit the outward movement of said rod.

When the parts are in the positions shown in Figs. 1 and 2 of the drawings, the cross-head 15 is in its uppermost and innermost positions, and the movable parts of the receptacle R are in a position to receive and collect the cut grass. If now the handle 18 is forced downwardly, the section $r'$ of the receptacle R is caused to turn upwardly and forwardly about its line of hinging 3 to the section $r$ in view of its connection with the cross-head 15 by the chain or cord 13, while simultaneously therewith the bottom 4 of the section $r$ is turned upwardly and rearwardly about its line of hinging 5 in view of its connection by the bars 10, links 11, and rods 12 with the section $r'$. When the handle 18 has been pushed fully forward, the sections $r$ and $r'$ will have assumed the positions shown in Fig. 3 and all the grass contained in the receptacle discharged in a compact mass or heap.

It will readily be seen that the discharging of the grass and the restoration of the parts to their normal or receiving positions can be accomplished by the operator in a very short time and with little exertion.

I do not wish to restrict myself to the particular mechanism herein shown and described for operating the section $r'$ and the hinged bottom 4, as it is evident that other means can be substituted without departing from the spirit of my invention, which consists, essentially, in the arrangement of the parts to act in the manner herein described for the purpose of receiving and discharging the cut grass at or near the center of the receptacle.

It is evident that the section $r'$ of the receptacle and the hinged bottom 4 could be simultaneously turned toward each other by connecting the chain 13 with the hinged bottom instead of to the section $r'$ and also that the parts 13, 14, 15, 16, 17, and 18 could be omitted and the rear section turned directly by hand to effect the dumping of the collected grass or the hinged section and the hinged bottom could be independently operated.

What I claim as new is—

1. A grass-catcher for lawn-mowers and the like comprising a stationary section having a hinged bottom adapted to swing upwardly, a section hinged to the stationary section to swing upwardly and outwardly, and a connection between the hinged section and the hinged bottom for causing simultaneous movement of the two parts, substantially as described.

2. A grass-catcher for lawn-mowers and the like comprising a stationary section provided with a hinged bottom adapted to swing upwardly, a section hinged to the stationary section to swing upwardly and outwardly, rods extending from the movable section and from the hinged bottom, and a link connecting the free ends of said rods, substantially as described.

3. A grass-catcher for lawn-mowers and the like comprising a receptacle formed in two sections, of which the front section is provided with a bottom hinged to its rear to turn upwardly and rearwardly, and the rear section is hinged to the upper, rear part of the front section to turn upwardly and forwardly, and means in connection with the hinged bottom and the rear section for turning the same to discharge the grass, substantially as described.

4. A grass-catcher for lawn-mowers and the like comprising a receptacle formed in two sections, of which the front section is provided with a bottom hinged to its rear to turn upwardly and rearwardly, and the rear section is hinged to the upper, rear part of the front section to turn upwardly and forwardly, a rod-and-link connection between the rear section and the hinged bottom of the front section, and operative means in connection with the rear section for turning the same, substantially as described.

5. A grass-catcher for lawn-mowers and the like comprising a receptacle formed in two sections, of which the front section is provided with a bottom hinged to its rear to turn upwardly and rearwardly, and the rear section is hinged to the upper, rear part of the front section to turn upwardly and forwardly, a rod-and-link connection between the rear section and the hinged bottom of the front section, a cross-head mounted to slide upon the mower-handle, a connection between the rear section of the receptacle and the cross-head, and a handle connected with said cross-head for sliding the same upon the mower-handle, substantially as and for the purpose specified.

6. A grass-catcher for lawn-mowers and the like comprising a receptacle formed in two sections, of which the front section is provided with a bottom hinged to its rear to turn upwardly and rearwardly, and the rear section is hinged to the upper, rear part of the front section to turn upwardly and forwardly, a rod-and-link connection between the rear section and the hinged bottom of the front section, a guide-bar extending longitudinally of the mower-handle and connected therewith, a cross-head mounted on said guide-bar and adapted to slide thereon, a cord or chain connecting the back of the rear section of the receptacle with said cross-head, a rod attached to said cross-head and extending in the longitudinal direction of the mower-handle, and a handle attached to said rod, substantially as and for the purpose set forth.

7. The catcher herein described consisting of a stationary section open at its rear and having a bottom hinged to the rear thereof to swing upwardly and rearwardly, a section open at its front and hinged to the stationary section to swing upwardly toward the same; the two sections when in their normal positions forming a box-like receptacle open at its top for the reception of the material cut, and means for moving the hinged bottom and the hinged section toward each other for effecting the discharge of the collected material from the receptacle.

In testimony whereof I have hereunto set my hand in the presence of two subscribing witnesses.

MICHAEL ROBACKER.

Witnesses:
CHARLES T. HOTALING,
JOHN G. MERRITT.